United States Patent
Hudson et al.

[11] Patent Number: 6,023,151
[45] Date of Patent: Feb. 8, 2000

[54] METHOD AND DEVICE FOR ENHANCING SMART BATTERY PERFORMANCE

[75] Inventors: Richard Hudson, Bell; Syed Rahman, Gainesville; Thorfinn Thayer, Gainesville; Jai Prakash, Gainesville; Nate Banes, Gainesville, all of Fla.

[73] Assignee: Eveready Battery Company, Inc., St. Louis, Mo.

[21] Appl. No.: 09/039,528

[22] Filed: Mar. 16, 1998

[51] Int. Cl.[7] .............................. H01H 35/00; H02J 7/00
[52] U.S. Cl. .................. 320/135; 320/134; 320/106; 307/130; 307/150
[58] Field of Search ..................... 320/135, 136, 320/130, 132; 324/426, 427, 429, 431, 433

[56] References Cited

U.S. PATENT DOCUMENTS

| | | |
|---|---|---|
| 5,480,734 | 1/1996 | Schulz et al. . |
| 5,541,489 | 7/1996 | Dunstan . |
| 5,606,242 | 2/1997 | Hull et al. . |
| 5,621,297 | 4/1997 | Feldstein . |
| 5,631,540 | 5/1997 | Nguyen . |
| 5,652,502 | 7/1997 | van Phuoc et al. . |
| 5,661,463 | 8/1997 | Letchak et al. . |
| 5,672,951 | 9/1997 | Shiota . |
| 5,691,621 | 11/1997 | Phuoc et al. . |
| 5,696,437 | 12/1997 | Panther et al. . |
| 5,804,894 | 9/1998 | Lesson et al. ............... 320/135 |

*Primary Examiner*—Peter S. Wong
*Assistant Examiner*—Pia Tibbits
*Attorney, Agent, or Firm*—Linda Gebauer; Robert W. Welsh

[57] ABSTRACT

The subject invention pertains to a method and device for implementing a dynamic End of Discharge Voltage (EODV) for rechargeable batteries and battery packs (batteries/packs). This dynamic EODV can be adjusted based on, for example, environment, operating conditions, temperature, residual capacity, cell chemistry, cell size, form factor, discharge rate, and/or the number of charge/discharge cycles the battery has undergone. The subject invention can provide for enhanced run time from each discharge cycle of the battery/pack. In addition, the subject invention can provide for more accurate save-to-disk alarms, while ensuring adequate energy for the actual save to disk operation. Furthermore, the subject invention can also extend the useful life of the battery/pack.

19 Claims, 3 Drawing Sheets

METHOD AND DEVICE FOR ENHANCING SMART BATTERY PERFORMANCE

BACKGROUND OF THE INVENTION

This invention relates to rechargeable batteries and battery packs and, in a particular embodiment, to smart batteries and battery packs (batteries/packs). The subject invention pertains to improving the accuracy of battery/pack capacity, remaining capacity, and remaining run time determinations. Advantageously, this invention can utilize a dynamic end of charge voltage to enhance the performance of rechargeable batteries/packs throughout the battery/pack life and over a wide variety of operating conditions and environments. This invention can enable battery/pack users to get more useable capacity out of each charge of the battery/pack and to more accurately track the battery/pack capacity.

Rechargeable batteries/packs are often used in applications, for example laptop computers, where battery/pack supplied energy is necessary to maintain certain information related to the user's application. In these situations, when the battery no longer can supply the ongoing energy requirement, some or all of this information can be lost. Accordingly, device designers and manufactures have incorporated techniques to alert a user and/or signal a host device as to the remaining capacity in the battery/pack, for example to initiate save-to-disk routines for laptop computers to avoid loss of information. By alerting a user when the battery/pack is approaching a point where the battery/pack has only enough capacity remaining to perform the save routine, a user can perform the save routine in time to avoid loss of valuable information. It is the goal to initiate these save routines at a point in the discharge cycle where enough capacity remains to perform the save routine with adequate margins for error, while minimizing excess unused capacity in the battery/pack.

Additionally, other events may be triggered when the battery/pack reaches certain output voltage levels, wherein the remaining charge is presumed to be correlated to these certain output voltage levels. For example, fuel gauge operations, shut down, and other remaining capacity communications with a host device or user can be triggered based on the output voltage level of the battery/pack.

Typically, a fixed End of Discharge Voltage (EODV) is used in battery/pack operating and charging algorithms, where the EODV is a voltage output of the battery/pack which, when reached, indicates that essentially all of the usable capacity of the battery/pack, over and above the capacity needed for any necessary terminal function, has been removed. Accordingly, for example in the context of a smart battery/pack, once this fixed EODV is reached an indication would be given to the host device or user to shutdown and recharge the battery/pack. Additionally, this fixed EODV often functions as the endpoint for determining the capacity of a battery/pack such that the capacity is defined to be essentially zero, or fixed finite amount, at the EODV. Accordingly, the accuracy of this EODV is very important to the performance of the battery/pack.

Due to internal resistance (IR) drops, for example due to the cell and interconnects, a fixed EODV is often inaccurate for these purposes. These IR drops from contact resistance, cell can resistance, wire resistance, trace resistance, electrode resistance, electrode/electrolyte interface resistance, electrolyte resistance, and protection circuitry can lead to an incorrect determination of the actual potential of the electrode of the battery/pack. In particular, at high discharge rates these IR drops can alter a battery/pack's discharge profile as a function of discharge rate and, due to the use of a fixed EODV, may lead to the determination that the battery/pack has delivered all the available capacity even when more capacity may still be available from the battery/pack. Furthermore, these IR drops can reduce the accuracy, or repeatability, of the fuel gauge at various discharge rates, for example when a fixed EODV is used to define zero, or near zero, capacity.

In addition, a fixed EODV can lead to inaccurate capacity determination as the number of times the battery/pack has been charged and discharged increases. For rechargeable batteries/packs, the voltage profile as it relates to capacity changes as a function of cycle life. Specifically, for certain batteries/packs, as the number of charging cycles increases the fixed EODV is reached at a point where more capacity is actually available than when the same fixed EODV is reached when the battery/pack had undergone fewer charging cycles.

Furthermore, other factors such as temperature, cell chemistry, form factor, residual capacity, and operating conditions can affect the accuracy of the capacity determinations. Accordingly, there is a need in the art for a method and apparatus to more accurately gauge remaining capacity and more accurately determine the end of discharge voltage for rechargeable batteries/packs.

BRIEF SUMMARY OF THE INVENTION

The subject invention pertains to a method and device for improving the accuracy of battery/pack capacity, remaining capacity, and remaining run time determinations. A specific embodiment of the subject invention relates to implementing a dynamic End of Discharge Voltage (EODV) for rechargeable batteries and battery packs (batteries/packs). This dynamic EODV can be adjusted based on, for example, environment, operating conditions, temperature, residual capacity, cell chemistry, cell size, form factor, discharge rate, and/or the number of charge/discharge cycles the battery has undergone. The subject invention can provide for enhanced run time from each discharge cycle of the battery/pack. In addition, the subject invention can provide for more accurate timing of save-to-disk alarms, while ensuring adequate energy for the actual save to disk operation. Furthermore, the subject invention can also extend the useful life of the battery/pack.

In a specific embodiment of the subject invention, a dynamic, as opposed to a fixed, EODV which depends on the number of charge/discharge cycles is utilized. A number of methods for dynamically changing the EODV can be utilized in accordance with the subject invention. In another specific embodiment of the subject invention, a dynamic EODV which depends on the discharge rate is utilized. Further embodiments can utilize a dynamic EODV which depends on temperature or some combination of cycle count, discharge rate, and/or temperature.

DETAILED DISCLOSURE OF THE INVENTION

The subject invention pertains to a method and device for improving the accuracy of battery/pack capacity, remaining capacity, and remaining run time determinations. A specific embodiment of the subject invention relates to implementing a dynamic End of Discharge Voltage (EODV) for rechargeable batteries and battery packs (batteries/packs). This dynamic EODV can be adjusted based on, for example, environment, operating conditions, temperature, residual capacity, cell chemistry, cell size, form factor, discharge rate, and/or the number of charge/discharge cycles the battery has undergone. The subject invention can provide for enhanced run time from each discharge cycle of the battery/pace In addition, the subject invention can provide for more accurate timing of save-to-disk alarms, while ensuring adequate energy for the actual save to disk operation. Furthermore, the subject invention can also extend the useful life of the battery/pack.

Figure 1:
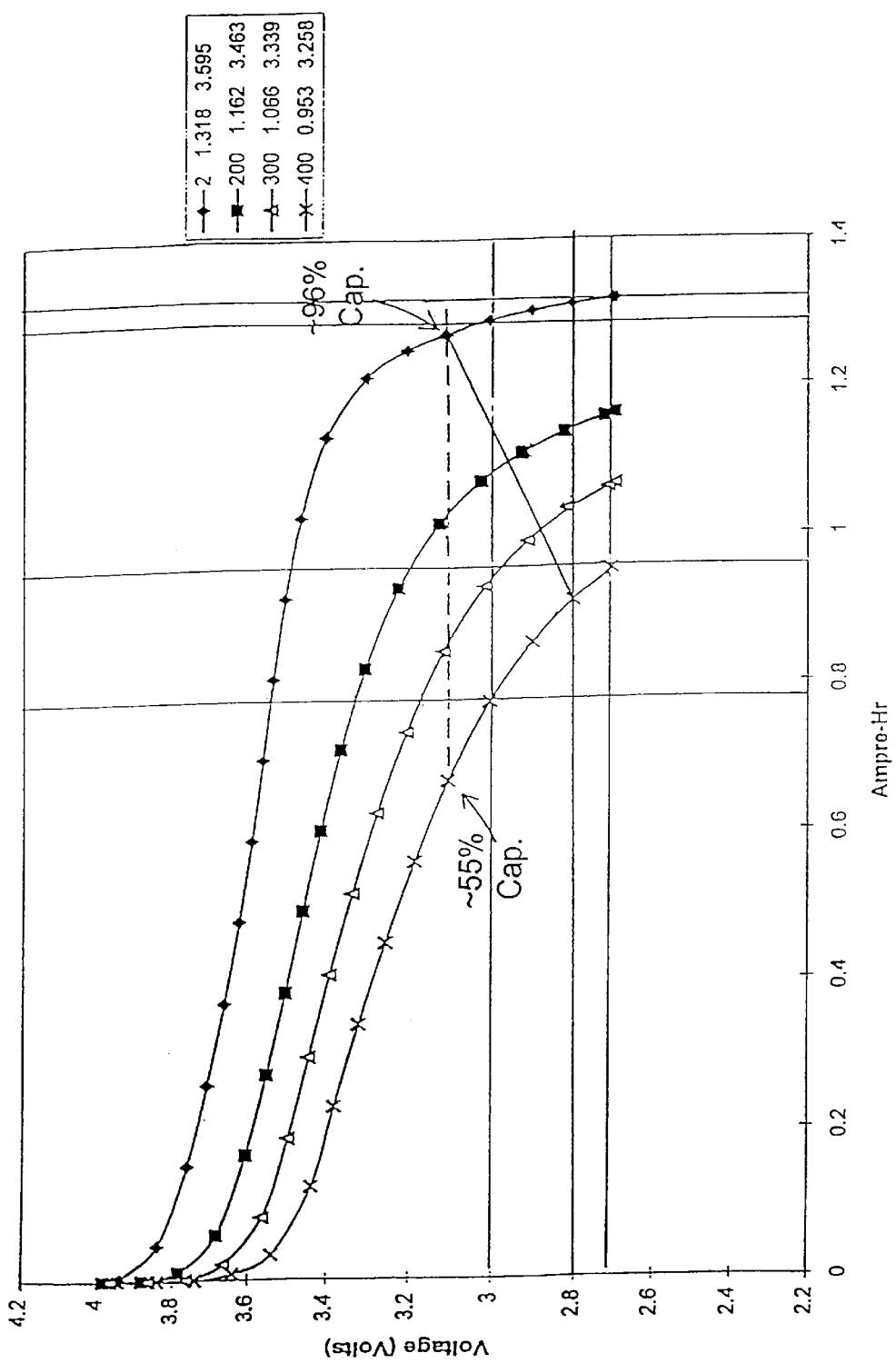
FIG. 1 shows the discharge profile as a function of charge/discharge cycles for a cell having a Li-ion cell chemistry.

In a specific embodiment of the subject invention, a dynamic, as opposed to a fixed, EODV which depends on the number of charge/discharge cycles is utilized. A number of methods for dynamically changing the EODV can be utilized in accordance with the subject invention. Referring to FIG. 1, typical discharge profiles for a single Li ion cell is shown for 2, 200, 300, and 400 charge/discharge cycles. It is shown that as the battery/pack undergoes additional charge/discharge cycles, the discharge profile changes. Although FIG. 1 illustrates typical discharge profiles for a Li-ion cell, the discharge profiles for cells of other cell chemistries can also change form as a function of the number of charge/discharge cycles. For example, the subject invention is applicable to Li-ion, NiCd, NiMH, Li-polymer, Li-ion family, as well as other present and future rechargeable cell chemistries.

Also shown in FIG. 1, is the impact of using a fixed voltage, 3.0 volts in FIG. 1, for triggering a suspend to disk operation. As this Li-ion cell preferably should not be discharged below the minimum critical operating voltage of 2.7 volts, the remaining available capacity is the difference in capacity, as read on the horizontal axis, from where the profile reaches 3.0 volts until the profile reaches 2.7 volts. In this example, after 2 cycles, this difference corresponds to approximately 40 mAh of capacity. After 400 cycles, this difference corresponds to approximately 180 mAh of capacity. If approximately40 mAh are needed to perform the save-to-disk operation and the save-to- disk operation is triggered at 3.0 volts, there is essentially no unused capacity for the battery/pack after just 2 cycles but approximately 140 mAh of unused capacity for the battery pack after 400 cycles.

Alternatively, if the save-to-disk operation is triggered at 2.8 volts for a cell which has undergone 400 cycles, there is only approximately 40 mAh of remaining capacity left. Accordingly, for a battery/pack having undergone 400 cycle/ discharge cycles, less unused capacity is left when the save-to-disk operation is triggered at a voltage of approximately 2.8 volts rather than 3.0 volts. Thus, triggering save to disk at 2.8 volts, rather than 3.0 volts, allows a user a longer run time.

In a specific embodiment of the subject invention, the Li-ion battery/pack of FIG. 1 is utilized with the EODV being determined by a straight line approximation, based on the number charge/discharge cycles. In this embodiment the EODV is determined for a Li-ion battery/pack, for which the discharge profile is shown in FIG. 1, by a straight-line approximation.

$$EODV = EODV_0 - (\text{constant})\ (\text{number of cycles}) \quad (1)$$

$$= 3100\ \text{mV} - \left(0.75\ \frac{\text{mV}}{\text{cycle}}\right)(\text{number of cycles}) \quad (2)$$

In this embodiment, equation (2) is used to determine EODV until 400 cycles is reached. After 400 cycles, EODV is maintained at 2.8 volts to avoid reaching the minimum critical operating voltage of 2.7 volts for this particular cell chemistry. This can also prevent the EODV from reaching a point where insufficient capacity is available at the EODV for example, for the save-to-disk operation.

The slope and initial EODV, $EODV_0$, with respect to the straight line approximation can be determined experimentally, and/or theoretically, for each battery/pack, and can vary for different cell chemistries, temperatures, discharge rates, residual capacity, and physical constructions. For example, measurements can be conducted for various combinations of factors and the resulting discharge profiles incorporated into the EODV determinations.

Alternative embodiments can employ, for example, second-order, third-order, or logarithmic approximations. In a preferred embodiment, a best-fit curve can be utilized with respect to the point on the discharge profile which leaves enough remaining capacity to perform the desired shutdown or save-to-disk operation, for each cycle count. One skilled in the art will appreciate from FIG. 1 that a selected number of discharge curves for any number of cycles can be generated for a particular application. A point on each discharge curve is then determined such that the remaining available capacity (for example, the difference between the capacity at the EODV and the capacity at the minimum critical operating voltage) of the battery at each point corresponds to a preselected capacity, such as the capacity necessary to perform a save-to-disk operation. These data points in turn correspond to a function that can be used to adjust the EODV based on the number of cycles. The function can be approximated using curve fitting methods know in the art such as polynomial equations or any other equations that best fit the data. Further embodiments, can employ a step wise EODV function or other functions which enhance the battery/pack performance and meet other system constraints, for example limited memory.

Monitoring circuitry, for example within a smart battery pack, can be utilized to monitor the terminal voltage of the battery/pack and to trigger, for example, a save-to-disk routine when the EODV is reached. For example, a status bit can be set when the terminal voltage is less than or equal to the EODV to allow the circuitry to initiate the save-to-disk routine. Monitoring circuitry can also be used to monitor the number of charge/discharge cycles for input into equation (1).

In another specific embodiment of the subject invention, a dynamic EODV which depends on the discharge rate is utilized. This dynamic EODV can provide a more accurate indication of the remaining capacity in the battery/pack, as compared with using a fixed EODV. With respect to the battery/pack of FIG. 2A, the EODV is lower for higher drain rates. In this embodiment, the EODV is a function of the instantaneous drain rate, due to the internal resistance components involved. If a fixed EODV is selected based on a C-rate discharge and the battery/pack is operated at 3 C, more capacity will be left in the battery/pack at EODV because the battery/pack voltage is depressed at higher discharge rates, Conversely, if the fixed EODV is selected such as to leave a desired capacity in the battery when discharged at a high rate, say 3 C, and the battery/pack is discharged at C-rate, less capacity will be left in the battery/pack and the terminating functions may not get completed. Using a dynamic EODV based on the actual discharge current gives a more accurate estimate of the residual capacity. The usual practice is to be conservative and select a fixed EODV corresponding to a low discharge rate, for example 1 C or below, resulting in unused capacity in the battery/pack when discharging to the EODV at a higher discharge rate. FIG. 2B shows the relationship between discharge profiles for a typical NiMH cell for different discharge rates, namely 0.2 C, 1 C, 2 C, and 3 C in FIG. 2B. The shift in the discharge profiles for different discharge rates can, at least in part, be attributed to the resistance components such as cell contacts and interconnects. Again, one skilled in the art will appreciate from FIG. 2B that a selected number of discharge curves for any number of discharge rates can be generated for a particular application. A point on each discharge curve can then be determined such that the remaining available capacity (for example, the difference between the capacity at the EODV and the capacity at the minimum critical operating voltage) of the battery at each point corresponds to a preselected capacity, such as that capacity necessary to perform a save-to-disk operation. These data points in turn correspond to a function that can be used to adjust the EODV based on the discharge rate. The function can be approximated using curve-fitting methods known in the art such as polynomial equations or any other equations that best fit the data.

If a fuel gauge measurement is to be performed by draining the battery/pack to the EODV and then charging the battery/pack, this fuel gauge measurement can be more accurate if the appropriate EODV for the drain rate is used. For example if a battery/pack is drained to a fixed EODV and then charged, assuming the remaining capacity to be zero at the EODV, the integration of the charging current over time can be used as a new learned capacity for the battery/pack. Note that when discharging the battery/pack to the fixed EODV to start the learned capacity measurement, the amount of residual capacity in the battery/pack at the EODV is related to the discharge rate. This will obviously affect the amount of additional charge the battery/pack can hold, thus impacting the learned capacity. Next, as the battery/pack is discharged by a user at a different rate than the discharge rate for the learned capacity measurement, the fixed EODV will be reached at a point on the discharge profile with a different remaining capacity than the remaining capacity at the beginning of the learned capacity measurement.

Accordingly, the shift in the discharge profile with respect different discharge rates and the corresponding difference in remaining capacity in the battery/pack at a fixed EODV for different discharge rates can lead to inaccuracies in remaining capacity predictions, unused remaining capacity upon reaching the fixed EODV, and/or reaching a fixed EODV without sufficient remaining capacity to perform any terminal functions which may be necessary.

The dynamic EODV of the subject invention which varies as a function of discharge rate can enhance the accuracy of fuel gauge operations and consistently allow a user to utilized more of the battery/pack's capacity during each discharge cycle. To illustrate, assume a battery is discharged at a 1 C rate and then charged, wherein the amount of charge is measured to provide a new learned capacity of the battery/pack. If the battery/pack has an accompanying fuel gauge, the fuel gauge will read full. As the battery/pack is discharged, the fuel gauge will indicate less than full, for example by integrating the discharge current over time to determine what percent of the now learned capacity is left. Note that the fuel gauge could instead indicate, for example, time remaining, capacity remaining, or any other desired format.

If the discharge rate is above 1 C and a fixed EODV is used, the fixed EODV would be reached before the fuel gauge indicates zero remaining capacity and, depending on the protocol, the user could be instructed, or forced, to shut down and charge the battery. This would leave unused remaining capacity in the battery/pack, set an incorrect zero remaining capacity for the next learned capacity, and give the user an incorrect indication of remaining capacity while the battery/pack was in use. Alternatively, if a dynamic EODV in accordance with the subject invention is utilized, the EODV can be lowered for the higher discharge rate allowing the use of more of the remaining capacity, making the fuel gauge indication more accurate, and set a more accurate zero remaining capacity for the next learned capacity.

If the battery/pack is discharged at a lower discharge rate than 1 C, for example 0.2 C, and a fixed EODV is utilized, then the fuel gauge will indicate the battery/pack is discharged before reaching the fixed EODV. Depending on the protocol used, the user may be instructed, or forced, to shutdown. The fuel gauge is showing no remaining capacity because the new learned capacity was zeroed when there was actual remaining capacity, thus causing the fuel gauge to underestimate the actual capacity of the battery/pack. Again, if the user shuts down when the fuel gauge indicates no remaining capacity, unused remaining capacity will be left in the battery. Alternatively, if a dynamic EODV in accordance with the subject invention is utilized, the EODV at the originally 1 C rate discharge which began the new learned capacity would have been lower and the new learned capacity would have been higher. Accordingly, the fuel gauge would have provided a more accurate indication of remaining capacity, allowing the user to use more of the battery/packs, remaining capacity.

Figure 2A:
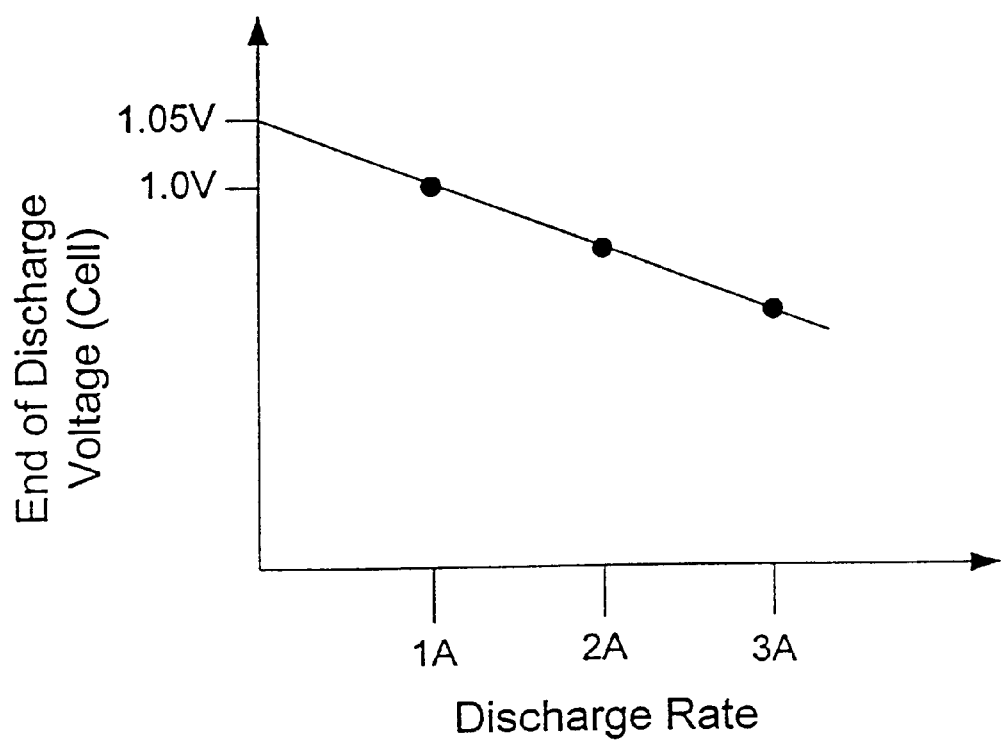
FIG. 2A schematically illustrates a straight-line approximation for a dynamic end of discharge voltage as a function of discharge rate for a specific embodiment of the subject invention.
Figure 2B:
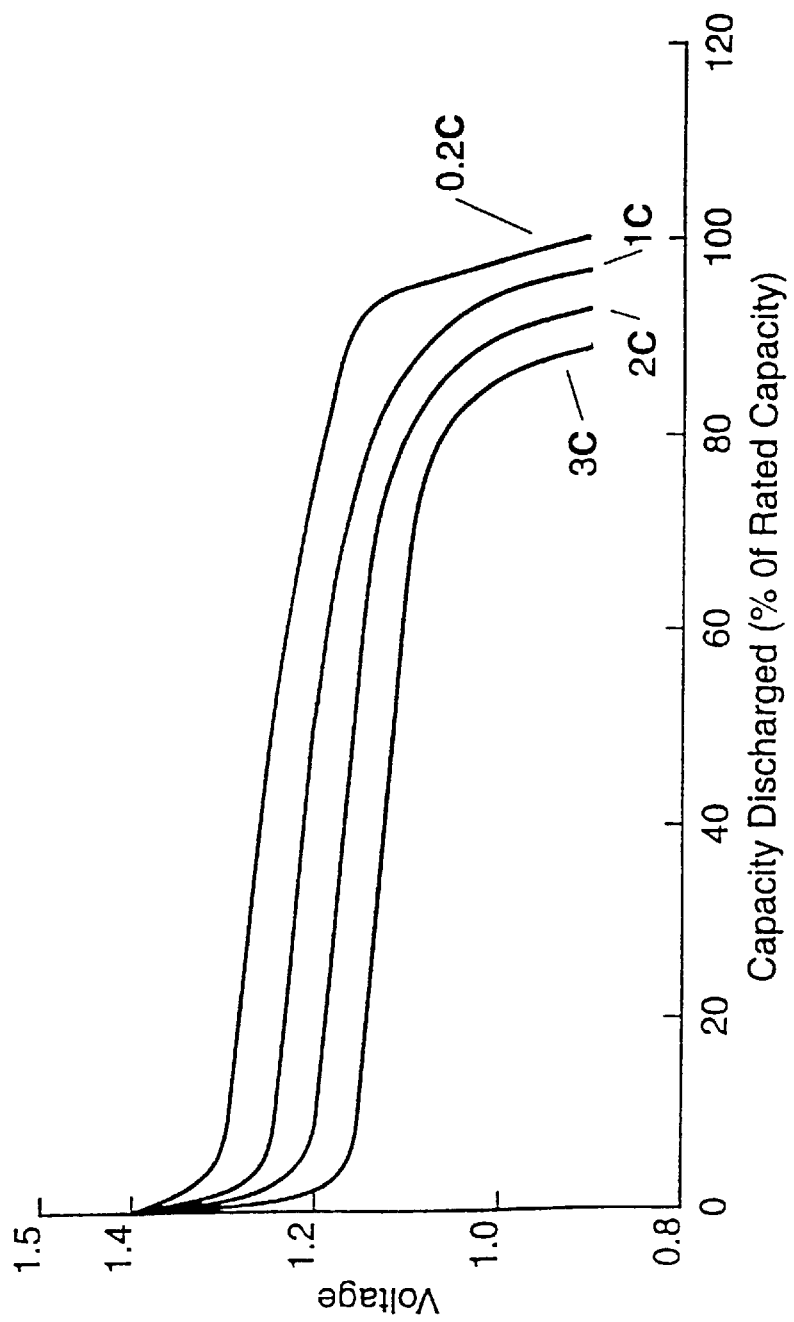
FIG. 2B illustrates the discharge profile as a function of discharge rate for a typical NiMH cell.

In a preferred embodiment, as shown in FIG. 2A, the determination of the EODV as a function of discharge rate can be made by use of a straight line approximation. FIG. 2A is for illustration purposes and shows how the EODV can depend on discharge rate. The slope and intercept for the straight line approximation can be derived by experiment, and/or by theory, and can vary for different cell chemistries, temperatures, residual capacity, cycle counts, and physical configuration. Alternative embodiments can employ, for example, second-order, third-order, or logarithmic approximations. In a further specific embodiment, a best-fit curve can be utilized.

Additional embodiments of the subject invention can adjust the EODV as a function of, for example, one or more of the following factors: charge/discharge cycle count, discharge rate, temperature, residual capacity, cell chemistry, form factor, and physical configuration. Measurements of discharge profiles can be taken for various combinations of factors and corresponding discharge profiles generated. These profiles can be incorporated into the algorithm for adjusting the EODV of the battery/pack. As mentioned, these algorithms can be implemented with equations that incorporate the desired factors. In addition, look up tables can be utilized. In a specific embodiment, a multi-dimensional look up table can be utilized with each dimension correlating to one of the factors considered.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A method for increasing the amount of useable capacity available to a user from a rechargeable battery/pack during a discharge cycle, comprising the steps of:
   (a) monitoring a number of charge/discharge cycles of a rechargeable battery/pack; and
   (b) adjusting an end of discharge voltage for said battery/pack based on the number of charge/discharge cycles, wherein the end of discharge voltage is used as an indication of full or near full discharge of the rechargeable battery/pack,
   wherein the adjustment of the end of discharge voltage minimizes the unused capacity remaining in the battery/pack at the end of a discharge cycle, and wherein the end of discharge voltage is adjusted based on a straight line approximation such that an initial end of discharge voltage is adjusted based on an equation using a constant multiplied by the number of charge/discharge cycles.

2. The method, according to claim 1, wherein the end of discharge voltage is held constant after a predetermined number of charge/discharge cycles such as to avoid the battery/pack reaching a minimum critical operating voltage.

3. A method for increasing the amount of useable capacity available to a user from a rechargeable battery/pack during a discharge cycle, comprising the steps of:
   (a) monitoring a number of charge/discharge cycles of a rechargeable battery/pack; and
   (b) adjusting an end of discharge voltage for said battery/pack based on the number of charge/discharge cycles, wherein the end of discharge voltage is used as an indication of full or near full discharge of the rechargeable battery/pack,
   wherein the adjustment of the end of discharge voltage minimizes the unused capacity remaining in the battery/pack at the end of a discharge cycle, and wherein the end of discharge voltage is adjusted based on a second order equation approximation.

4. A method for increasing the amount of useable capacity available to a user from a rechargeable battery/pack during a discharge cycle, comprising the steps of:
   (a) monitoring a number of charge/discharge cycles of a rechargeable battery/pack; and
   (b) adjusting an end of discharge voltage for said battery/pack based on the number of charge/discharge cycles, wherein the end of discharge voltage is used as an indication of full or near full discharge of the rechargeable battery/pack,
   wherein the adjustment of the end of discharge voltage minimizes the unused capacity remaining in the battery/pack at the end of a discharge cycle, and wherein the end of discharge voltage is adjusted based on a best fit equation approximation.

5. A method for increasing the amount of useable capacity available to a user from a rechargeable battery/pack during a discharge cycle, comprising the steps of:
   (a) monitoring a number of charge/discharge cycles of a rechargeable battery/pack; and
   (b) adjusting an end of discharge voltage for said battery/park based on the number of charge/discharge cycles, wherein the end of discharge voltage is used as an indication of full or near full discharge of the rechargeable battery/pack,
   wherein the adjustment of the end of discharge voltage minimizes the unused capacity remaining in the battery/pack at the end of a discharge cycle, and wherein upon the rechargeable battery/pack reaching the end of discharge voltage an alert is sent to a user such that the user can perform a terminal function before the battery/pack has insufficient capacity to perform the terminal function.

6. The method, according to claim 5, wherein said terminal function is a save-to-disk operation.

7. A method for increasing the amount of useable capacity available to a user from a rechargeable battery/pack during a discharge cycle, comprising the steps of:
   (a) monitoring a number of charge/discharge cycles of a rechargeable battery/pack: and
   (b) adjusting an end of discharge voltage for said battery/pack based on the number of charge/discharge cycles, wherein the end of discharge voltage is used as an indication of full or near full discharge of the rechargeable battery/pack,
   wherein the adjustment of the end of discharge voltage minimizes the unused capacity remaining in the battery/pack at the end of a discharge cycle, and wherein upon the rechargeable battery/pack reaching the end of discharge voltage the battery/pack provides one or more of the following group:
      a fuel gauge reading, a time remaining reading, a critical message for end of discharge, an end of discharge alarm under the SMBus standard, and a remaining capacity reading.

8. A method for increasing the amount of useable capacity available to a user from a rechargeable battery/pack, comprising the steps of:
   (a) monitoring a discharge rate of a rechargeable battery/pack; and
   (b) adjusting an end of discharge voltage for said battery/pack based on the discharge rate, wherein the end of discharge voltage is used as an indication of full or near full discharge of the rechargeable battery/pack,
   wherein the adjustment of the end of discharge voltage minimizes the unused capacity remaining in the battery/pack at the end of a discharge cycle, and wherein the end of discharge voltage is adjusted based on a straight line approximation such that an initial end of discharge voltage is adjusted based on an equation using a constant multiplied by the discharge rate.

9. The method, according to claim 8, wherein the end of discharge voltage is held constant after the discharge rate reaches a predetermined value such as to avoid the battery/pack reaching a minimum critical operating voltage.

10. A method for increasing the amount of useable capacity available to a user from a rechargeable battery/pack, comprising the steps of:
   (a) monitoring a discharge rate of a rechargeable battery/pack; and
   (b) adjusting an end of discharge voltage for said battery/pack based on the discharge rate, wherein the end of discharge voltage is used as an indication of full or near full discharge of the rechargeable battery/pack,
   wherein the adjustment of the end of discharge voltage minimizes the unused capacity remaining in the battery/pack at the end of a discharge cycle, and wherein the end of discharge voltage is adjusted based on a second order equation approximation.

11. A method for increasing the amount of useable capacity available to a user from a rechargeable battery/pack, comprising the steps of:

(a) monitoring a discharge rate of a rechargeable battery/pack; and (b) adjusting an end of discharge voltage for said battery/pack based on the discharge rate, wherein the end of discharge voltage is used as an indication of full or near full discharge of the rechargeable battery/pack, wherein the adjustment of the end of discharge voltage minimizes the unused capacity remaining in the battery/pack at the end of a discharge cycle, and wherein the end of discharge voltage is adjusted based on a best fit equation approximation.

12. A method for increasing the amount of useable capacity available to a user from a rechargeable battery/pack, comprising the steps of:

(a) monitoring a discharge rate of a rechargeable battery/pack; and (b) adjusting an end of discharge voltage for said battery/pack based on the discharge rate, wherein the end of discharge voltage is used as an indication of full or near full discharge of the rechargeable battery/pack, wherein the adjustment of the end of discharge voltage minimizes the unused capacity remaining in the battery/pack at the end of a discharge cycle, and wherein upon the rechargeable battery/pack reaching the end of discharge voltage an alert is sent to a user such that the user can perform a terminal function before the battery/pack has insufficient capacity to perform the terminal function.

13. The method, according to claim 12, wherein said terminal function is a save-to-disk operation.

14. A method for increasing the amount of useable capacity available to a user from a rechargeable battery/pack, comprising the steps of:

(a) monitoring a discharge rate of a rechargeable battery/pack; and (b) adjusting an end of discharge voltage for said battery/pack based on the discharge rate, wherein the end of discharge voltage is used as an indication of full or near full discharge of the rechargeable battery/pack, wherein the adjustment of the end of discharge voltage minimizes the unused capacity remaining in the battery/pack at the end of a discharge cycle, and wherein upon the rechargeable battery/pack reaching the end of discharge voltage the battery/pack provides one or more of the following group:

a fuel gauge reading, a time remaining reading, a critical message for end of discharge, an end of discharge alarm under the SMBus standard, and a remaining capacity reading.

15. A method for determining the remaining capacity of a rechargeable battery/pack, comprising the following steps:

(a) monitoring one or more of the following group: cycle count, discharge rate, and temperature;

(b) adjusting an initial remaining capacity value based on the results of the monitoring in step (a), wherein the initial remaining capacity value is based on a learned capacity of the battery/pack less a measured used capacity.

16. The method according to claim 15, wherein the remaining capacity determination is used to select a point in time to initiate a terminal function.

17. The method according to claim 16, wherein said terminal function is a save-to-disk operation, wherein said save-to-disk operation is initiated when the remaining capacity is approximately equal to an amount of capacity required to execute said save-to-disk operation.

18. The method according to claim 16, wherein said terminal function is an alert to a user.

19. The method according to claim 15 wherein the remaining capacity determination is used to provide one or more of the following group: a fuel gauge reading, a time remaining reading, a critical message for end of discharge, an end of discharge alarm under the SMBus standard, and a remaining capacity reading.

* * * * *